Patented July 5, 1938

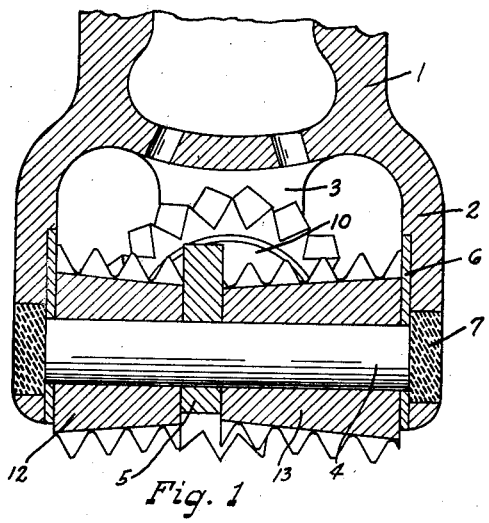
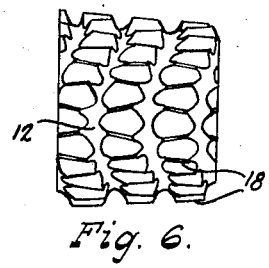
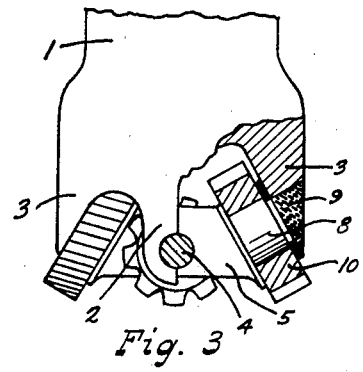
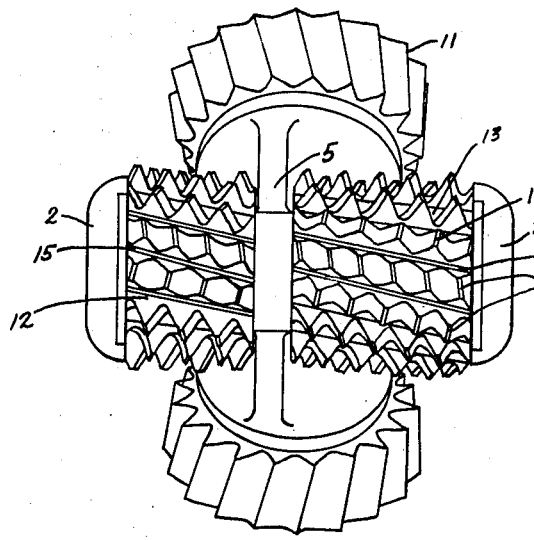
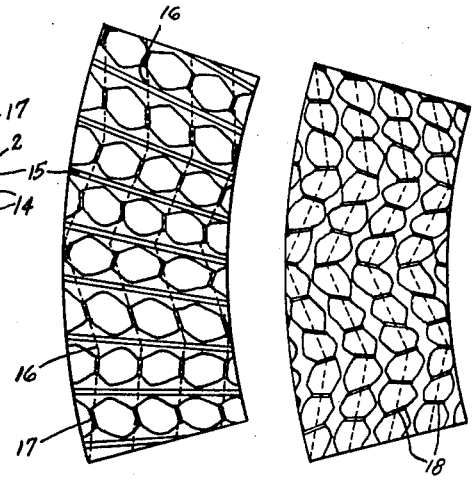

2,122,759

UNITED STATES PATENT OFFICE 2,122,759

DRILL CUTTER

Floyd L. Scott, Houston, Tex., assignor to Hughes Tool Company, Houston, Tex., a corporation of Texas Application July 16, 1936, Serial No. 90,839

6 Claims. (Cl. 255—71)

My invention relates to drill cutters and has particular application to the formation of the teeth on the cutting periphery of the cutter.

In the type of well drill known as the cross roller drill it is desirable to arrange the cutters so that the teeth will cut the full bottom of the hole. Where the teeth are formed in a regular manner on the cutting elements the teeth on the cutters tend to track upon the well bottom so that the teeth fall within imprints already made by the same or other cutters. When this occurs the teeth do not efficiently disintegrate the material on which the drill is operating and speed cannot be maintained. In attempting to overcome this difficulty it is customary to form the teeth spirally around the cutters, but even this expedient does not entirely overcome the tendency of the teeth to track in prints already made due to the regularity of the spiral.

It is an object of my invention to form the teeth on the cutters so that they will not track in the prints of teeth previously cut upon the well bottom, but will cut irregularly and thus cover the whole area of the well bottom more effectively.

I contemplate forming the teeth in lines running in zig-zag direction about the cutting periphery of each cutter and to position the crest of each adjacent tooth so that it points in a direction different from that of the one preceding or the one following the same.

By so forming the teeth I have as an object to obtain tracks upon the well bottom in which the line cut by the crest of one tooth will be crossed by the line cut by the crest of the next tooth to cut at that point.

Referring to the drawing herewith, Fig. 1 is a central vertical section through the lower end of a drill embodying the invention.

Fig. 2 is a bottom plan view of said drill.

Fig. 3 is a broken elevation of a drill head with certain parts in section.

Figs. 4 and 5 are developments of the cutting surface of a cutter embodying the invention, each figure illustrating a different embodiment.

Fig. 6 is a side elevation of the Fig. 5 type of cutter.

The drill illustrated is a cross roller drill having a head 1, with two pairs of forwardly projecting legs 2 and 3. The opposed pair of legs 2 support the cross roller shaft 4 while the legs 3 support the bridge 5. As will be seen from Fig. 1, the cross roller shaft 4 is secured through washers 6 to the legs 2 by a bond of welding material 7 which is welded into an opening in each leg. The bridge 5 is flattened between its ends and has an opening to allow the cross roller shaft to extend therethrough. At its ends it is upwardly inclined and cutter shafts 8 are formed thereon. Said shafts are welded to the legs 3 by welding material 9.

The side cutters 10 are mounted on the shafts 8 and are inclined upwardly and inwardly in the usual manner. The cutting teeth 11 upon the side cutters are cut at an angle to the axis thereof, the teeth on one set being cut at an angle inclined outwardly and forwardly in the direction of rotation and the teeth on the other cutter are angled to incline the crests outwardly and rearwardly.

My invention has particular application to the cross roller cutters 12 and 13. As will be seen from the drawing, the cutter 12 is shorter than the cutter 13. The cutter 13 thus extends past the center of the drill and acts to cover the full bottom of the hole in its rotation. Each cutter tapers slightly away from its outer end.

The teeth 14, upon each cutter, are arranged in rows longitudinally of the cutter, but said rows are arranged at an angle to the longitudinal axis of the cutter. The troughs or grooves between the rows are designated by the numeral 15. The teeth extend in zig-zag lines about the circumference of the cutters. To show this feature clearly Figs. 4 and 5 have been made. Each of these views are developments of the complete surface of the cutter. The cutting surface may be imagined as removed and spread out.

With reference to Fig. 4, the dotted lines 16 indicate the circumferential rows. As will be seen the row is in a wavy or zig-zag line. This will avoid any tendency of the teeth to track in the imprints cut by preceding teeth. Also it will be seen that they are formed with chisel shaped crests 17 and that the crest of the teeth in one longitudinal row are set at an angle to the cutter axis which is different from the angle of the tooth crest upon the teeth in the longitudinal row preceding. Thus it will be understood that if, by chance, the teeth on a cutter would track in a preceding imprint already made on the well bottom the cut made would not fit therein, but would cross the same and thus tend to disintegrate the formation encountered.

In the embodiment shown in Fig. 5 the crests 18 of the teeth are arranged at an angle to the zig-zag lines about the circumference of the cutter which cuts said line more nearly perpendicular thereto. The crests of the teeth instead of running about the circumference of the cutter run longitudinally of the cutter. This type of tooth has better traction on the bottom of the hole due to the position of the cutter cress, as will be seen in Fig. 6.

Teeth thus formed and positioned on the periphery of a drill cutter are found to cut the well bottom more rapidly because of the manner in which they contact the material and cut away the same. Each tooth cuts a track different from other teeth and the whole of the well bottom is effectively engaged by the teeth. Thus without the addition of extra weight upon the drill a cutting and penetrating action of the teeth is obtained in the most effective manner and a maximum of drilling speed is obtained.

What I claim as new is:

1. A drill cutter mounted to roll upon the well bottom, teeth formed on the outer periphery thereof, said teeth being chisel-shaped with cutting crests thereon and formed in rows longitudinally of the cutter and also in rows in a zig-zag direction around the circumference of the cutter and troughs between said circumferential rows.

2. A drill cutter mounted to roll upon the well bottom, teeth formed on the outer periphery thereof, said teeth being chisel-shaped with cutting crests thereon and formed in rows longitudinally of the cutter and also in rows in a zig-zag direction around the circumference of the cutter, said circumferential rows having troughs between them, said longitudinal rows being inclined relative to the longitudinal axis of the cutter.

3. A drill cutter mounted to roll upon the well bottom, teeth formed on the outer periphery thereof, said teeth being chisel-shaped with cutting crests thereon and formed in rows longitudinally of the cutter and also in rows in a zig-zag direction around the circumference of the cutter, the crests of the teeth in one longitudinal row being inclined relative to the axis of the cutter in a direction different from that of the teeth in rows adjacent thereto.

4. A well drill including a head, two upwardly and inwardly inclined side cutters and two inwardly tapered cross roller cutters mounted thereon, the teeth on said cross roller cutters being formed in rows longitudinally of the periphery thereof, and also in rows circumferentially about the same, said circumferential rows forming irregular zig-zag lines, said circumferential rows being spaced apart by intervening troughs.

5. A well drill including a head, two upwardly and inwardly inclined side cutters and two inwardly tapered cross roller cutters mounted thereon, the teeth on said cross roller cutters being formed in rows longitudinally of the periphery thereof, and also in rows circumferentially about the same, said circumferential rows being in zig-zag lines spaced apart by intervening troughs, the crests of the teeth being elongated and chisel-shaped and lying at an angle inclined from the direction of the said circumferential row.

6. A well drill cutter tapered slightly from its outer end toward its inner end, rows of teeth on said cutter extending in wavy rows around the circumference thereof, the crests of said teeth being chisel-shaped, the crests of any teeth on one row lying at a different angle relative to the cutter axis than the crests on teeth adjacent thereto in the same or different rows.

FLOYD L. SCOTT.